United States Patent
Hashimoto et al.

(10) Patent No.: US 11,640,150 B2
(45) Date of Patent: May 2, 2023

(54) COMMUNICATION SYSTEM, COMMUNICATION METHOD, AND INFORMATION STORAGE MEDIUM

(71) Applicant: Kabushiki Kaisha Yaskawa Denki, Kitakyushu (JP)

(72) Inventors: Ayaka Hashimoto, Kitakyushu (JP); Hirotaka Niimi, Kitakyushu (JP); Toshinobu Kira, Kitakyushu (JP); Wataru Nozaki, Kitakyushu (JP); Masaomi Kudo, Kitakyushu (JP); Yu Katono, Kitakyushu (JP); Hiroshi Okamoto, Kitakyushu (JP); Takeshi Nagata, Kitakyushu (JP); Takaaki Shogaki, Kitakyushu (JP); Megumi Yasuda, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 413 days.

(21) Appl. No.: 16/789,427

(22) Filed: Feb. 13, 2020

(65) Prior Publication Data
US 2020/0264577 A1  Aug. 20, 2020

(30) Foreign Application Priority Data
Feb. 15, 2019  (JP) .............................. JP2019-025387

(51) Int. Cl.
*G05B 19/042* (2006.01)
*G05B 19/418* (2006.01)

(52) U.S. Cl.
CPC ..... *G05B 19/0426* (2013.01); *G05B 19/4185* (2013.01); *G05B 2219/35001* (2013.01); *G05B 2219/37532* (2013.01)

(58) Field of Classification Search
None
See application file for complete search history.

(56) References Cited

U.S. PATENT DOCUMENTS

| | | | |
|---|---|---|---|
| 8,572,290 B1 * | 10/2013 | Mukhopadhyay | G06N 20/00 709/251 |
| 11,269,768 B2 * | 3/2022 | Lutz | G06F 12/0862 |

(Continued)

FOREIGN PATENT DOCUMENTS

| | | | |
|---|---|---|---|
| EP | 3211497 A1 * | 8/2017 | ........... G05B 19/054 |
| EP | 3211497 A1 | 8/2017 | |

(Continued)

OTHER PUBLICATIONS

Search Report dated Jul. 6, 2020, for corresponding EP Patent Application No. 20157150.2.

(Continued)

*Primary Examiner* — Philip Wang
*Assistant Examiner* — Rongfa P Wang
(74) *Attorney, Agent, or Firm* — Hea Law PLLC

(57) ABSTRACT

Provided is a communication system, in which a first industrial machine and a second industrial machine are configured to communicate to/from each other, the communication system comprising circuitry configured to synchronize first time information updated by the first industrial machine and second time information updated by the second industrial machine with each other, wherein the second industrial machine is configured to: acquire state data on the second industrial machine; and transmit to the first industrial machine the second time information at a time when the state data is acquired and the state data.

20 Claims, 8 Drawing Sheets

(56) References Cited

U.S. PATENT DOCUMENTS

| | | | |
|---|---|---|---|
| 11,270,276 B1* | 3/2022 | Magerkurth | G06Q 40/08 |
| 11,422,915 B2* | 8/2022 | Nagata | G05B 23/0264 |
| 11,449,232 B1* | 9/2022 | Kannan | G06F 3/0659 |
| 11,449,449 B2* | 9/2022 | Kim | G06F 13/372 |
| 2002/0065940 A1* | 5/2002 | Suzuki | H04J 3/0664 |
| | | | 709/248 |
| 2003/0018652 A1* | 1/2003 | Heckerman | G06Q 30/0641 |
| 2005/0105678 A1* | 5/2005 | Nakashima | A61B 6/5223 |
| | | | 378/4 |
| 2010/0082531 A1* | 4/2010 | Sakamoto | G06F 11/3476 |
| | | | 707/E17.01 |
| 2010/0199002 A1* | 8/2010 | Izumi | G05B 19/05 |
| | | | 710/61 |
| 2011/0093635 A1* | 4/2011 | Matsumoto | H04L 12/403 |
| | | | 710/110 |
| 2011/0093949 A1* | 4/2011 | Macrae | G06F 16/951 |
| | | | 726/19 |
| 2011/0289302 A1* | 11/2011 | Ubukata | G06F 11/3466 |
| | | | 712/E9.016 |
| 2012/0159641 A1* | 6/2012 | Rossi | G01D 4/004 |
| | | | 702/61 |
| 2013/0254660 A1* | 9/2013 | Fujioka | A63F 13/12 |
| | | | 715/741 |
| 2014/0126677 A1 | 5/2014 | Fritsch | |
| 2015/0046742 A1* | 2/2015 | Hata | G06F 1/14 |
| | | | 713/502 |
| 2016/0170437 A1* | 6/2016 | Aweya | H04B 10/071 |
| | | | 713/503 |
| 2016/0191752 A1* | 6/2016 | Takitsune | H04N 5/04 |
| | | | 348/518 |
| 2016/0238659 A1* | 8/2016 | Shiromoto | H04L 69/40 |
| 2017/0068236 A1 | 3/2017 | Iname et al. | |
| 2018/0314233 A1* | 11/2018 | Horiguchi | G05B 13/027 |
| 2019/0005693 A1* | 1/2019 | Fujiyama | G06T 11/206 |
| 2019/0042223 A1* | 2/2019 | Gorshkov | G06F 11/3466 |
| 2019/0101875 A1* | 4/2019 | Kikunaga | G05B 19/05 |
| 2019/0149702 A1* | 5/2019 | Satoh | H04N 5/06 |
| | | | 348/521 |
| 2019/0158249 A1* | 5/2019 | Harada | H04W 72/1278 |
| 2019/0171192 A1* | 6/2019 | Nishiyama | G06F 9/52 |
| 2019/0212769 A1* | 7/2019 | Carlough | G06F 13/1673 |
| 2019/0387434 A1* | 12/2019 | Li | H04L 43/0894 |
| 2020/0004608 A1* | 1/2020 | Baba | G06F 9/54 |
| 2020/0012258 A1* | 1/2020 | Yung | G05B 19/4063 |
| 2020/0050176 A1* | 2/2020 | Saegusa | G05B 19/414 |
| 2020/0096959 A1* | 3/2020 | Gubba Ravikumar | |
| | | | G05B 17/02 |
| 2020/0198136 A1* | 6/2020 | Yamaguchi | G05D 1/0088 |
| 2020/0244381 A1* | 7/2020 | Yoneda | H04J 3/14 |
| 2020/0396688 A1* | 12/2020 | Hong | H04B 17/318 |
| 2021/0181709 A1* | 6/2021 | Hashimoto | G05B 19/19 |
| 2021/0281339 A1* | 9/2021 | Sakaue | H04J 3/0638 |
| 2022/0048432 A1* | 2/2022 | Switalski | B60K 37/06 |
| 2022/0291671 A1* | 9/2022 | Gotou | G05B 19/41825 |
| 2022/0291695 A1* | 9/2022 | Hatori | G05D 1/0287 |

FOREIGN PATENT DOCUMENTS

| | | | | |
|---|---|---|---|---|
| EP | 3382481 A1 | 10/2018 | | |
| EP | 3432463 A1 | 1/2019 | | |
| GB | 2298502 A | * | 9/1996 | G05B 19/052 |
| JP | 2002095068 A | 3/2002 | | |
| JP | 2010198600 A | 9/2010 | | |
| JP | 2017079009 A | 4/2017 | | |
| JP | 2018151918 A | 9/2018 | | |
| WO | 2015/068210 A1 | 5/2015 | | |
| WO | 2015136971 A1 | 9/2015 | | |
| WO | 2018084036 A1 | 5/2018 | | |

OTHER PUBLICATIONS

Office Action dated Oct. 20, 2020, for corresponding JP Patent Application No. 2019-025387 with partial English translation pp. 1-4.

Office Action dated Feb. 2, 2022, for corresponding EP Patent Application No. 20157150.2, p. 1-6.

* cited by examiner

FIG.4

| GLOBAL TIMER CURRENT VALUE | CONTROLLER COUNTER CURRENT VALUE |
|---|---|
| 200.00 | 100000 |

| GLOBAL TIMER | CONTROLLER COUNTER |
|---|---|
| 000.00 | 00000 |
| 000.01 | 00005 |
| 000.02 | 00010 |
| 000.03 | 00015 |
| ... | ... |
| 200.00 | 100000 |

FIG.5

| CONTROLLER COUNTER | GLOBAL COUNTER | TRACE DATA |
|---|---|---|
| 50000 | 100.00 | 101 |
| 50010 | 100.02 | 95 |
| 50020 | 100.04 | 80 |
| ... | ... | ... |

COMMUNICATION SYSTEM, COMMUNICATION METHOD, AND INFORMATION STORAGE MEDIUM

CROSS-REFERENCE TO RELATED APPLICATION

The present disclosure contains subject matter related to that disclosed in Japanese Patent Application JP2019-025387 filed in the Japan Patent Office on Feb. 15, 2019 the entire contents of which are hereby incorporated by reference.

BACKGROUND OF THE INVENTION

1. Field of the Invention

The embodiments disclosed herein relate to a communication system, a communication method, and an information storage medium.

2. Description of the Related Art

In WO 2015/068210 A1, there is described a system including a controller and a motor control apparatus configured to operate in accordance with a command of the controller, in which the motor control apparatus transmits trace data, which is an example of state data, to the controller.

SUMMARY OF THE INVENTION

According to one aspect of the present invention, there is provided a communication system, in which a first industrial machine and a second industrial machine are configured to communicate to/from each other, the communication system comprising circuitry configured to synchronize first time information updated by the first industrial machine and second time information updated by the second industrial machine with each other, wherein the second industrial machine is configured to: acquire state data on the second industrial machine; and transmit to the first industrial machine the second time information at a time when the state data is acquired and the state data.

BRIEF DESCRIPTION OF THE DRAWINGS

FIG. 4 is a table for showing a data storage example of timer data.

FIG. 5 is a table for showing a data storage example of a logging file.

DESCRIPTION OF THE EMBODIMENTS

1. Overall Configuration of Communication System

From a viewpoint of the inventor of the present invention, in a communication system in which a first industrial machine and a second industrial machine communicate to/from each other, the first industrial machine may acquire state data on the second industrial machine in order to execute breakdown prediction and breakdown diagnosis for the second industrial machine. However, with the related art, even when the first industrial machine acquires the state data from the second industrial machine, the first industrial machine cannot identify at which time point the state data indicates a state. As a result of extensive research and development for enabling the first industrial machine to accurately grasp the time point at which the state data of the second industrial machine was acquired, the inventor of the present invention has conceived a novel and original communication system and the like. A detailed description is now given of the communication system and the like according to an embodiment of the present invention.

Figure 1:
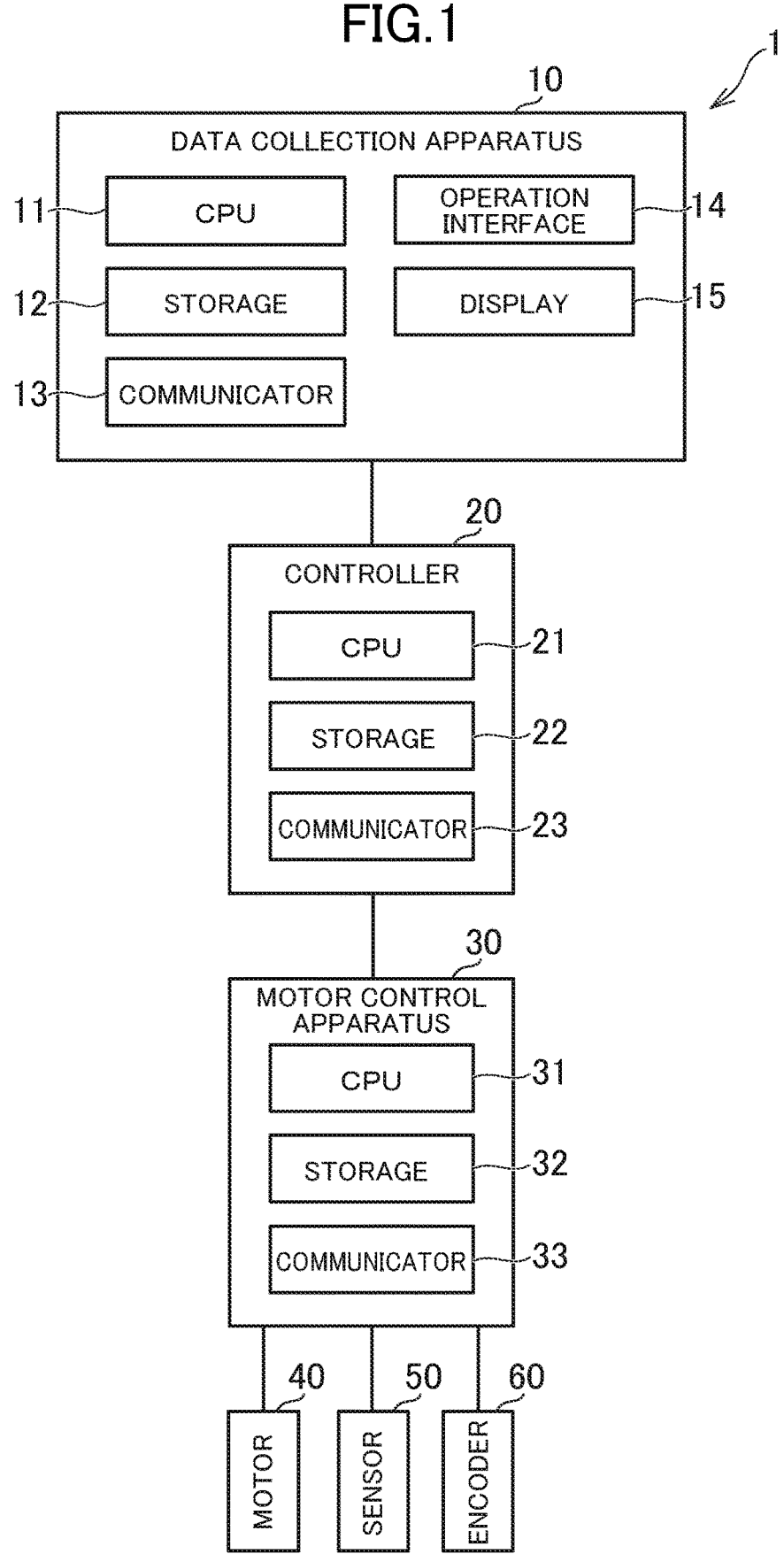
FIG. 1 is a diagram for illustrating an example of an overall configuration of a communication system according to an embodiment of the present invention.

FIG. 1 is a diagram for illustrating an example of an overall configuration of the communication system according to the embodiment. As illustrated in FIG. 1, the communication system 1 includes a data collection apparatus 10, a controller 20, a motor control apparatus 30, a motor 40, a sensor 50, and an encoder 60. In this configuration, one component is illustrated for each of those components for the sake of simple description, but the communication system 1 may include a plurality of components for each of the components. For example, a plurality of data collection apparatus 10 may be included in the communication system 1, or a plurality of controllers 20 may be connected to one data collection apparatus 10 as in a modification example of the present invention described later.

The data collection apparatus 10 is a computer configured to collect state data. The state data is data indicating a state of a machine. For example, the state data may be data indicating a state at a certain time point, or may be trace data indicating a state change in time series. The state of the machine is information indicating an operation of the machine, and may be a physical quantity detected by the sensor 50 or the encoder 60, and may be a state (for example, a CPU usage rate, a memory usage rate, and a communication load) inside the controller 20 or the motor control apparatus 30.

In this embodiment, a description is given of trace data as an example of the state data. Therefore, a portion described as "trace data" in this embodiment can be replaced by "state data". For example, a change in physical quantity detected by the sensor 50 or the encoder 60 in time series is indicated in the trace data. The trace data represents a log (history) of an operation, and is thus also referred to as "logging data". For example, in the trace data, a torque signal, temperature information, a feedback speed, a position deviation, a speed deviation, or a current deviation is expressed in time series.

For example, the data collection apparatus 10 is a server computer, a personal computer, a cellular phone (including a smartphone), or a mobile terminal (including a tablet terminal). The data collection apparatus 10 includes a CPU 11, a storage 12, a communicator 13, an operation interface 14, and a display 15.

The CPU 11 includes at least one processor. The storage 12 includes a RAM, an EEPROM, and a hard disk, and is configured to store various programs and data. The CPU 11 is configured to execute various types of processing based on those programs and data. The communicator 13 includes a network card and a communication interface, for example, various types of communication connectors, and is configured to communicate to/from other devices. The operation interface 14 is an input device such as a mouse and a keyboard. The display 15 is a liquid crystal display, an organic EL display, or the like, and is configured to display various types of screens in accordance with an instruction from the CPU 11.

The controller 20 is an apparatus configured to control the motor control apparatus 30. In this embodiment, a description is given of a case in which the controller 20 controls one motor control apparatus 30, but the controller 20 may control a plurality of motor control apparatus 30. Further, not only the motor control apparatus 30 but also sensors and input/output devices may be connected to the controller 20, for example.

In this embodiment, the controller 20 is an example of a first industrial machine. Therefore, a portion described as the controller 20 can be replaced by the first industrial machine in this embodiment. The industrial machine is a general name of a machine configured to support or take over work executed by humans, and peripheral machines of the machine. For example, in addition to the controller 20, the motor control apparatus 30 described later corresponds to the industrial machine. In addition, for example, a robot controller, an industrial robot, an inverter, a converter, a machine tool, and a programmable logic controller (PLC) correspond to the industrial machine.

For example, the controller 20 includes a CPU 21, a storage 22, and a communicator 23. The physical configuration of the CPU 21, the storage 22, and the communicator 23 is the same as that of the CPU 11, the storage 12, and the communicator 13. The controller 20 may include an integrated circuit for a specific application (ASIC), for example, motor control.

The motor control apparatus 30 is an apparatus configured to control the motor 40. The motor control apparatus 30 may also be referred to as "servo amplifier" or "servopack" (trademark). In this embodiment, a description is given of a case in which the motor control apparatus 30 controls one motor 40, but the motor control apparatus 30 may control a plurality of motors 40. Further, not only the motor 40, the sensor 50, and the encoder 60, but also input/output devices and the like may be connected to the motor control apparatus 30.

The motor control apparatus 30 is an example of the second industrial machine. Therefore, a portion described as "motor control apparatus 30" can be replaced by "second industrial machine" in this embodiment. The meaning of the "industrial machine" is as described above. The second industrial machine is a machine communicably connected to the first industrial machine. The first industrial machine is a machine for receiving the trace data from the second industrial machine (a machine of a transmission destination of the trace data). The second industrial machine is a machine for transmitting the trace data (a machine of a transmission source of the trace data). The second industrial machine may also be considered as a machine configured to generate the trace data, or a machine whose operation is to be analyzed.

In this embodiment, a description is given of a case in which the first industrial machine is a master machine, and the second industrial machine is a slave machine, but the first industrial machine and the second industrial machine may not be in the master/slave relationship as in the modification example described later. In other words, the master/slave relationship or a hierarchical relationship may not exist between the first industrial machine and the second industrial machine.

The "master machine" is a machine configured to control the slave machine, and is a machine configured to transmit a command to the slave machine. In other words, the master machine is a machine configured to acquire an operation state from the slave machine. The "slave machine" is a machine configured to operate based on a command from the master machine, and is a machine to be controlled by the master machine. In other words, the slave machine is a machine configured to transmit the own operation state to the master machine. In this embodiment, the motor control apparatus 30 operates based on the command from the controller 20. Thus, the controller 20 corresponds to the master machine, and the motor control apparatus 30 corresponds to the slave machine.

For example, the motor control apparatus 30 includes a CPU 31, a storage 32, and a communicator 33. The physical configuration of the CPU 31, the storage 32, and the communicator 33 is the same as that of the CPU 11, the storage 12, and the communicator 13. The motor control apparatus 30 may include an integrated circuit for a specific application (ASIC), for example, motor control. The motor control apparatus 30 is configured to control a voltage directed to the motor 40 connected through power lines based on the command received from the controller 20. The motor 40 may be a motor of a rotary type or a linear type.

The sensor 50 is only required to be a sensor capable of detecting a physical quantity, and is, for example, a torque sensor, a temperature sensor, a force sensor, or a motion sensor. The encoder 60 is a machine configured to detect a position or a speed of the motor 40, and is, for example, an optical or magnetic motor encoder. The encoder 60 is also a type of sensor. The motor control apparatus 30 is configured to transmit a physical quantity detected by the sensor 50 and a feedback speed detected by the encoder 60 to the controller 20 at any timing.

Programs and data described as being stored in each of the data collection apparatus 10, the controllers 20, and the motor control apparatus 30 may be supplied through the network. Moreover, the hardware configurations of the data collection apparatus 10, the controllers 20, and the motor control apparatus 30 are not limited to the above-mentioned examples, and various types of hardware can be applied. For example, a reader (for example, optical disc drive or memory card slot) configured to read a computer-readable information storage medium and an input/output device (for example, USB terminal) configured to directly connect to an external device may be included. In this case, programs and data stored in the information storage medium may be supplied through the reader or the input/output device.

2. OVERVIEW OF COMMUNICATION SYSTEM

In the communication system 1, the controller 20 and the motor control apparatus 30 communicate to/from each other. The controller 20 transmits the command to the motor control apparatus 30, and the motor control apparatus 30 controls the motor 40 based on the command. The controller 20 and the motor control apparatus 30 are connected to each other through the so-called Field Network, and communication is executed through use of any communication protocol. The communication system 1 according to this embodiment can use synchronous communication, and the controller 20 uses the synchronous communication so as to transmit the command to the motor control apparatus 30.

The "synchronous communication" is such a communication method that a timing at which a machine on a transmission side transmits data and a timing at which a machine on a reception side receives the data are synchronized. In the synchronous communication, other processing is not executed in principle in a period from transmission of a request of data communication to a reception of a response. Therefore, the machine on the transmission side transmits the data to the machine on the reception side, and then waits for the reception of the response. When the machine on the reception side receives the data from the machine on the transmission side, the machine on the reception side immediately executes processing so as to return a processing result as the response to the machine on the transmission side. When the machine on the transmission side receives the processing result, the machine on the transmission side transitions to next processing. When the synchronous communication is not executed, the communication is executed through use of asynchronous communication.

The "asynchronous communication" is such a communication method that the timing at which the machine on the transmission side transmits data and the timing at which the machine on the reception side receives the data are not synchronized. In the asynchronous communication, other processing can be executed in the period from the transmission of the request for the data communication to the reception of the response. Therefore, in the asynchronous communication, the machine on the transmission side can execute other processing in the period from the transmission of the data to the machine on the reception side to the reception of the response. Moreover, in the asynchronous communication, the machine on the reception side may not always execute the processing immediately after the reception of the data from the machine on the transmission side. The machine on the reception side postpones the execution of the processing until a predetermined condition is satisfied, or preferentially executes processing of the synchronous communication.

In this embodiment, a command transmitted through use of the synchronous communication is referred to as "synchronous task," and a command transmitted through use of the asynchronous communication is referred to as "asynchronous task." For example, when the controller 20 transmits a synchronous task to the motor control apparatus 30, the controller 20 waits without executing other processing until the response from the motor control apparatus 30 is received. When the motor control apparatus 30 receives the synchronous task from the controller 20, the motor control apparatus 30 immediately executes the synchronous task, and transmits a processing result to the controller 20.

Meanwhile, when the controller 20 transmits an asynchronous task to the motor control apparatus 30, the controller 20 can then execute other processing before the reception of the response from the motor control apparatus 30. For example, the controller 20 can transmit another asynchronous task or transmit a synchronous task until the response of the asynchronous task is received. When the motor control apparatus 30 receives the asynchronous task from the controller 20, the motor control apparatus 30 may not always execute the asynchronous task immediately.

For example, when a condition for executing the asynchronous task is set, the motor control apparatus 30 does not execute the asynchronous task until this condition is satisfied. In addition, for example, when a priority is assigned to each task, the motor control apparatus 30 preferentially executes other task higher in priority than the asynchronous task, and postpones the asynchronous task. When the motor control apparatus 30 executes the asynchronous task, the motor control apparatus 30 transmits a processing result to the controller 20.

If the controller 20 instructs the motor control apparatus 30 to start to acquire the trace data as a synchronous task, the motor control apparatus 30 immediately starts to acquire the trace data, and transmits the trace data to the controller 20. Therefore, when the start of the acquisition of the trace data is processed as a synchronous task, the controller 20 can identify at which time point the received trace data was acquired.

However, the synchronous communication is often used for transmitting important data directly relating to the operation of the motor 40, and the synchronous communication may not be able to be used for the trace data. For example, the trace data is mainly used for the breakdown prediction and the breakdown diagnosis, and is thus low in urgency and importance compared with the operation command and the like, and may be acquired later without haste. Therefore, it is considered that the synchronous communication is preferably used for data higher in urgency and importance. Moreover, the trace data is time-series information, and is thus relatively large in data size. Therefore, when the trace data is transmitted through use of the synchronous communication, a period in which the network is occupied becomes longer.

In view of this, in this embodiment, a start of acquisition of the trace data is processed as an asynchronous task. With this respect, the asynchronous task is not always executed immediately, and it is not known when the asynchronous task is to be executed. Thus, even when the controller 20 receives the trace data, the controller 20 cannot identify at which time point the state data indicates a state.

For example, when the motor control apparatus 30 receives an instruction to start the acquisition of the trace data as an asynchronous task, a condition for executing the asynchronous task may be satisfied immediately, or the condition may be satisfied only after a long period of time. Moreover, the motor control apparatus 30 does not always transmit the trace data immediately after the acquisition of the trace data has been completed. Thus, even when the controller 20 receives the trace data, the controller 20 cannot identify at which time point the trace data indicates a state.

In view of this, in this embodiment, time information is synchronized between the controller 20 and the motor control apparatus 30, and the motor control apparatus 30 transmits the trace data together with the time information. With this configuration, the controller 20 is enabled to accurately grasp a time point at which the trace data on the motor control apparatus 30 was acquired.

The "time information" is a numerical value indicating time managed by a machine, and may be referred to as, for example, "timer" or "counter." In this embodiment, the time information is synchronized between the controller 20 and the motor control apparatus 30, and the time information thus indicates time common to those machines. The time information has any number of bits, but, in this embodiment, has approximately several tens of bits (for example, from about 16 bits to about 64 bits) in order to suppress memory consumption. Moreover, the time information may be represented as an integer or a numerical value having a part after the decimal point.

The "synchronization of time information" means matching of time information with one another among a plurality of machines, and means matching time information on a certain machine and time information on another machine with each other. In other words, the synchronization of time information is to overwrite, correct, or update time information on another machine based on time information on a certain machine. Values may not be completely matched with each other, and a slight margin may be permitted in the synchronization of time information.

The time information to be synchronized between the controller 20 and the motor control apparatus 30 is hereinafter referred to as "global timers." Therefore, a portion described as "global timer" in this embodiment can be replaced by "time information."

In this embodiment, the global timer of the controller 20 is an example of the first time information, and the global timer of the motor control apparatus 30 is an example of the second time information. Therefore, in this embodiment, a portion in which the global timer of the controller 20 is described can be replaced by the first time information, and a portion in which the global timer of the motor control apparatus 30 is described can be replaced by the second time information.

Figure 2:
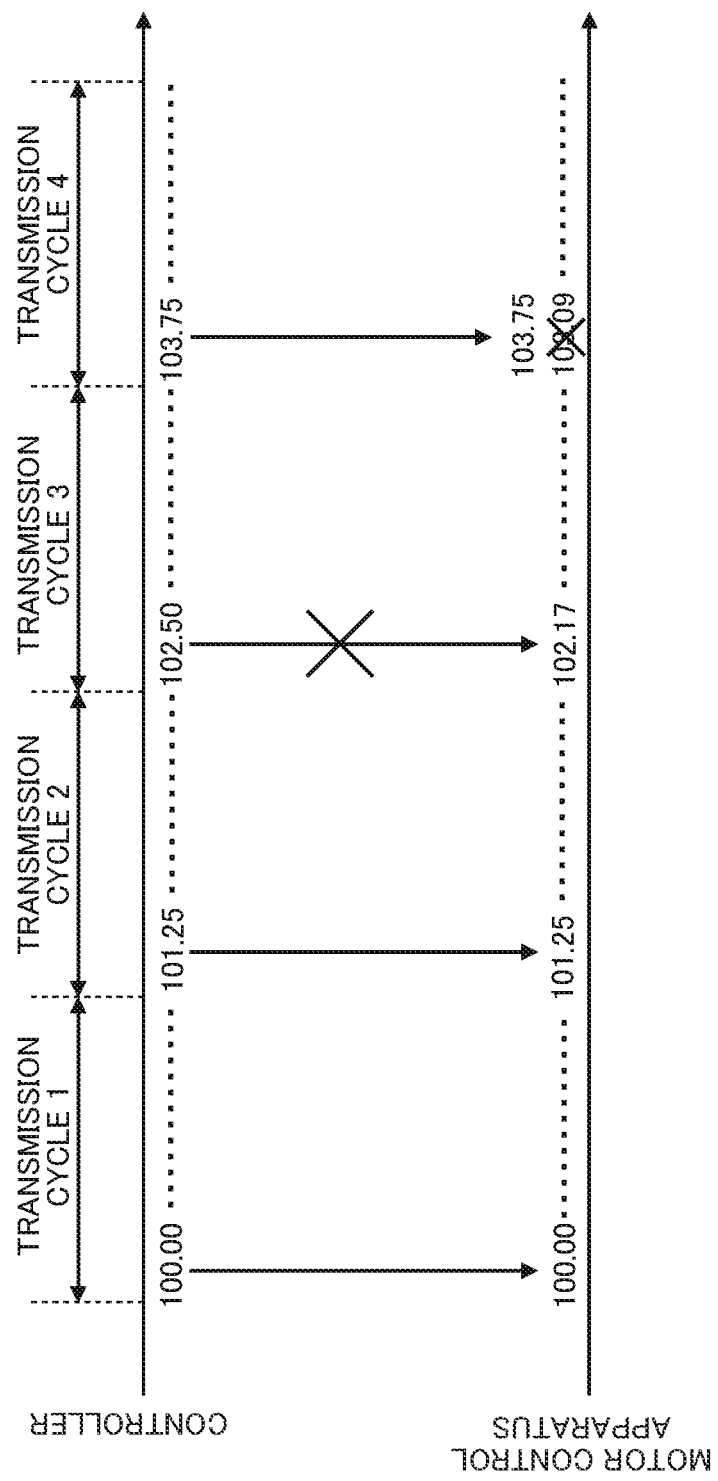
FIG. 2 is a diagram for illustrating how global timers are synchronized with each other.

FIG. 2 is a diagram for illustrating how global timers are synchronized with each other. The horizontal axis of FIG. 2 is a time axis. In this embodiment, a description is given of a case in which constant cyclic communication is executed between the controller 20 and the motor control apparatus 30, but cyclic communication may not particularly be executed. The controller 20 stores the global timer in the storage 22. The motor control apparatus 30 stores the global timer in the storage 32.

In this embodiment, a description is given of a case in which a synchronous task of synchronizing the global timers with each other is executed immediately after a start of a transmission cycle, but the synchronous task may be executed at any timing in the transmission cycle. For example, the synchronous task may be executed immediately before an end of the transmission cycle, or the synchronous task may be executed at a timing other than the timings immediately after the start of and immediately before the end of the transmission cycle. Moreover, the synchronous task may not be executed in every transmission cycle, and may be executed in, for example, every two transmission cycles or five transmission cycles.

In the example of FIG. 2, in a "transmission cycle 1," the controller 20 transmits a numerical value of "100.00" indicated by the global timer of the storage 22 to the motor control apparatus 30. When the motor control apparatus 30 receives this numerical value from the controller 20, the motor control apparatus 30 processes this numerical value as a synchronous task, overwrites the value of the global timer in the storage 32 so as to be "100.00," and transmits a processing result as a response. As a result, the global timer of the controller 20 and the global timer of the motor control apparatus 30 can be matched with each other. The response may not be transmitted. This point applies to the following description.

Subsequently, the controller 20 counts up the global timer of the storage 22, and the motor control apparatus 30 counts up the global timer of the storage 32. An increment of the global timer per one count-up may be any value, and is "0.01" in this embodiment, but the global timer may be incremented in another unit, for example, "0.02." The global timer may only be updated under a predetermined rule, and may not be counted up, but may be counted down. The global timer may be updated by the CPU 11 or the CPU 21, or may be updated by an ASIC.

An update cycle (count-up speed) of the global timer depends on performance of hardware, for example, a clock frequency, or a current operation environment. The controller 20 and the motor control apparatus 30 do not have the completely same performance and operation environments, and hence a deviation gradually increases between the global timer of the controller 20 and the global timer of the motor control apparatus 30. Therefore, even in a case in which the global timers are synchronized with each other at the start of the "transmission cycle 1," when a next "transmission cycle 2" arrives, there may occur such a state in which the global timer of the controller 20 indicates "101.25" and the global timer of the motor control apparatus 30 indicates "101.19."

When the "transmission cycle 2" arrives, the same synchronous task as that in the "transmission cycle 1" is executed, and the global timer of the motor control apparatus 30 is overwritten so as to be "101.25" indicated by the global timer of the controller 20. As a result, even when the global timers deviate from each other, the global timers can again be synchronized with each other between the controller 20 and the motor control apparatus 30. Subsequently, the controller 20 and the motor control apparatus 30 individually count up the global timers.

Similarly, when a "transmission cycle 3" arrives, the controller 20 transmits a numerical value of "102.50" indicated by the global timer stored in the own storage 22 to the motor control apparatus 30. However, the synchronous task may not accurately be executed due to a communication failure or the like, and hence the global timers may not be synchronized with each other between the controller 20 and the motor control apparatus 30. In this case, as illustrated in FIG. 2, the global timer of the motor control apparatus 30 indicates, for example, "102.17," and thus remains deviated. Subsequently, the global timers cannot be synchronized with each other between the controller 20 and the motor control apparatus 30 until a next "transmission cycle 4" arrives, and the deviation between the global timers thus gradually increases.

When the "transmission cycle 4" arrives, the communication failure or the like has been solved, and the synchronous task is accurately executed, the global timers can again be synchronized with each other between the controller 20 and the motor control apparatus 30. Therefore, as illustrated in FIG. 2, the global timer of the motor control apparatus 30, which was not able to be synchronized in the "transmission cycle 3," becomes "103.75," which is the same as that of the controller 20, in the "transmission cycle 4. In this way, even when the global timers are not synchronized with each other, the global timers can immediately be synchronized with each other in the next transmission cycle, and the deviation can be prevented from becoming so larger. The global timers are similarly synchronized with each other in subsequent transmission cycles.

In this embodiment, a description is given of the case in which the global timer of the motor control apparatus 30 is synchronized with the global timer of the controller 20, but the global timer of the controller 20 may conversely be synchronized with the global timer of the motor control apparatus 30. In this case, for example, the controller 20 transmits a synchronous task of causing the motor control apparatus 30 to transmit the global timer. The controller 20 may receive the global timer from the motor control apparatus 30, and may overwrite the global timer in the storage 22 so as to be matched with the global timer of the motor control apparatus 30.

As described above, the communication system 1 synchronizes the global timers between the controller 20 and the motor control apparatus 30. In this embodiment, when the motor control apparatus 30 starts the acquisition of the trace data, the motor control apparatus 30 holds the global timer at this time point, and transmits the held global timer together with the trace data.

As a result, even when the start of the acquisition of the trace data is processed as an asynchronous task, the controller 20 can easily grasp at which time point the trace data was acquired through use of the global timer received together with the trace data. A detailed description is now given of the communication system 1.

3. FUNCTIONS TO BE IMPLEMENTED IN COMMUNICATION SYSTEM

Figure 3:
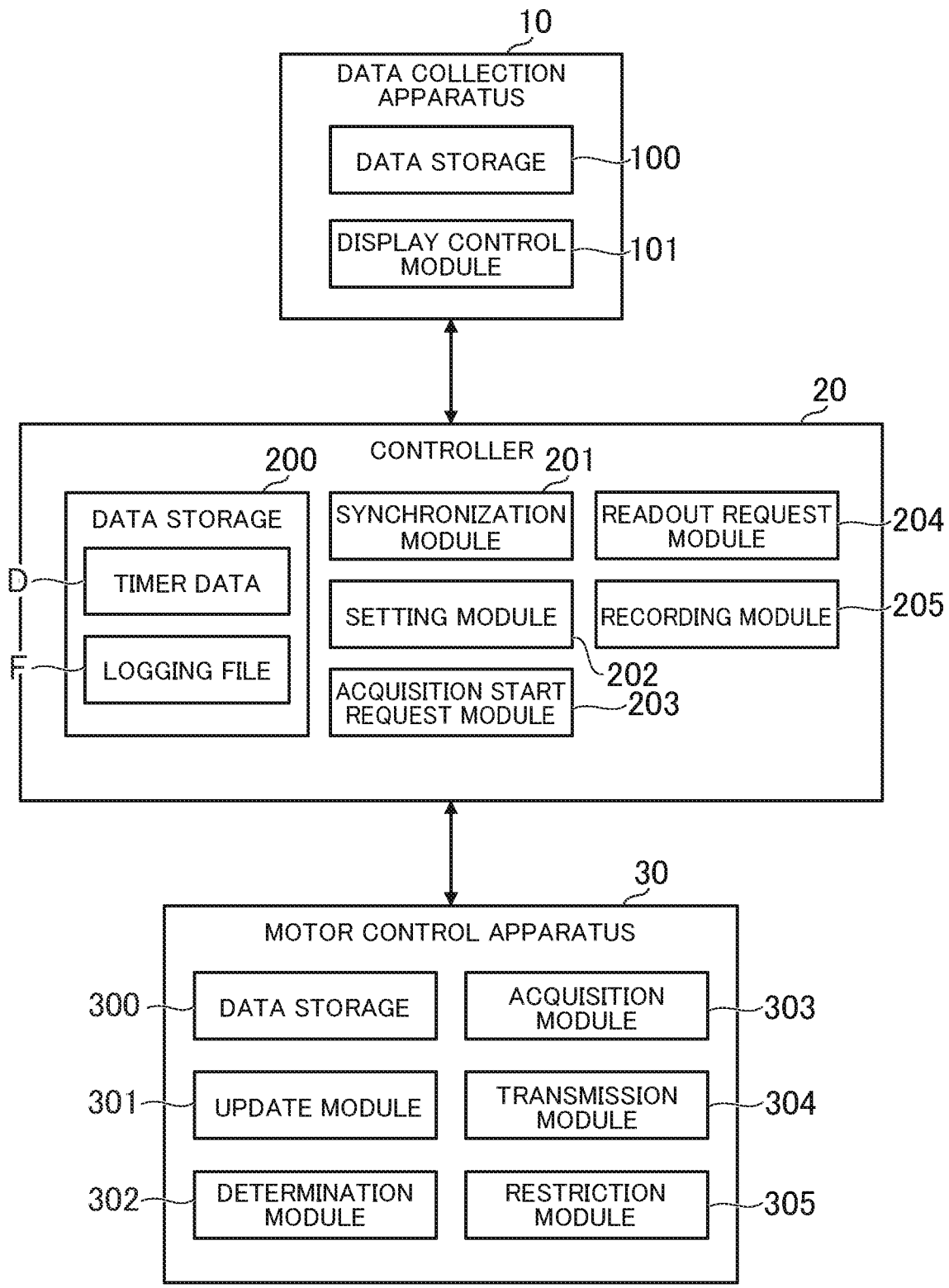
FIG. 3 is a functional block diagram for illustrating functions to be implemented in the communication system.

FIG. 3 is a functional block diagram for illustrating functions to be implemented in the communication system 1. The functions to be implemented by each of the data collection apparatus 10, the controller 20, and the motor control apparatus 30 are now described.

[3-1. Functions to be Implemented in Controller]

As illustrated in FIG. 3, in the controller 20, a data storage 200, a synchronization module 201, a setting module 202, an acquisition start request module 203, a readout request module 204, and a recording module 205 are implemented. The data storage 200 is implemented mainly by the storage 22. The synchronization module 201, the setting module 202, the acquisition start request module 203, the readout request module 204, and the recording module 205 are implemented mainly by the CPU 21.

[Data Storage]

The data storage 200 is configured to store data required for synchronizing the global timer and acquiring the trace data. For example, the data storage 200 stores timer data D, in which current values of the global timers are stored, and a logging file F, in which trace data acquired in the past is stored.

FIG. 4 is a table for showing a data storage example of the timer data D. In this embodiment, the controller 20 includes time information different from the global timer, and this time information is hereinafter referred to as "controller counter." As shown in FIG. 4, for example, the current value of the global timer, the current value of the controller counter, and a correspondence between the global timer and the controller counter are stored in the timer data D.

The current value of the global timer is a value of the global timer that the controller 20 is counting up. When the current value of the global timer is counted up to the maximum value that can be expressed by the number of bits of the global timer, the current value returns to an initial value. The global timer is the time information for the synchronization with another machine, while the controller counter is an absolute time managed by the controller 20, and is time information that is not externally corrected in principal.

The number of bits of the controller counter may be any number of bits, and may be the same as or different from that of the global timer. In this embodiment, the number of bits of the controller counter is larger than that of the global timer, and can thus express a longer period. For example, a sufficient number of bits are secured for the controller counter, and the controller counter is configured so as not to return to the initial value even when the global timer returns to the initial value. Therefore, the global timer can be converted to the absolute time in the controller 20 by converting the global timer accompanying the trace data to the controller counter. The global timer may be used for conversion to time (time, and day, month, and year) that can be visually recognized by the human.

The controller 20 updates not only the global timer, but also the controller counter, which is the time information different from the global timer. In this embodiment, a description is given of a case in which the controller counter is counted up, but the controller counter maybe updated by being counted down. Moreover, an update cycle of the controller counter and an update cycle of the global timer may be the same as or different from each other. Moreover, an increment of the controller counter and an increment of the global timer per count-up may be the same as or different from each other.

The correspondence between the global timer and the controller counter is used to convert the global timer to the controller counter. For example, when the controller 20 counts up the global timer and the controller counter, the controller 20 stores the global timer and the controller counter at that time point in association with each other in the timer data D. As a result, when the controller 20 receives the trace data, the controller 20 comes to be able to covert the global timer received together to the controller counter. That is, the controller 20 comes to be able to display the trace data in a temporal scale (absolute time) of the controller 20. When the global timer returns to the initial value, the controller counter associated with the global timer may be overwritten.

FIG. 5 is a table for showing a data storage example of the logging file F. The logging file F is a file in which the trace data is stored, and is referred to as a name different from the trace data in this embodiment, but may not particularly be distinguished from the trace data. As shown in FIG. 5, each of the numerical values contained in the trace data is stored in association with a time point at which the numerical value was acquired in the logging file F. In this embodiment, the controller counter and the global timer are provided, and hence each of the numerical values contained in the trace data is associated with the controller counter and the global timer.

The data stored in the data storage 200 is not limited to the above-mentioned example. For example, the data storage 200 may store acquisition conditions for the trace data described later. In addition, for example, the data storage 200 may store machine information indicating a configuration of machines connected to the controller 20, and may store IP addresses of the data collection apparatus 10 and the motor control apparatus 30. Moreover, for example, the data storage 200 may store commands directed to the motor control apparatus 30 in time series. For example, the data storage 200 may store a relationship between the controller counter or the global timer indicating a time point at which an operation command (for example, a position command speed) for the motor 40 is transmitted and details of this operation command in time series. The relationship therebetween may be defined in a program or a parameter, and the data storage 200 may store the program or the parameter.

[Synchronization Module]

The synchronization module 201 is configured to synchronize the global timer updated by the controller 20 and the global timer updated by the motor control apparatus 30. In this embodiment, the synchronization module 201 transmits the global timer of the controller 20 to the motor control apparatus 30, to thereby synchronize the global timer of the motor control apparatus 30 with the global timer of the controller 20. Conversely, the synchronization module 201 may receive the global timer from the motor control apparatus 30, to thereby synchronize the global timer of the controller 20 with the global timer of the motor control apparatus 30.

In this embodiment, the communication system 1 can execute the synchronous communication, and hence the synchronization module 201 uses the synchronous communication so as to synchronize the global timer of the controller 20 and the global timer of the motor control apparatus 30 with each other. The synchronization module 201 executes the synchronous task, to thereby synchronize those global timers with each other. In this embodiment, the synchronous task is the command to overwrite the global timer of the motor control apparatus 30 with the global timer of the controller 20, but the synchronous task may be a command to transmit the global timer of the motor control apparatus 30. In this case, the synchronization module 201 overwrites the global timer of the data storage 200 with the global timer received from the motor control apparatus 30.

For example, the synchronization module 201 transmits a synchronization request containing the global timer of the controller 20 to the motor control apparatus 30. The synchronization request is a request for synchronizing the global timers with each other. The synchronization request is only required be executed through transmission of data having a predetermined format, and contains an identifier for identifying the synchronization request. In this embodiment, the synchronization request is processed as a synchronous task, and hence the motor control apparatus 30 causes an update module 301 described later to overwrite the global timer of a data storage 300 with the global timer of the controller 20 contained in the synchronization request immediately after the reception of the synchronization request.

[Setting Module]

The setting module 202 is configured to set the acquisition conditions for the trace data to the motor control apparatus 30. The acquisition condition are conditions referred to when the trace data is acquired, and include, for example, a trigger condition for starting the acquisition of the trace data, an axis to be traced, a type of information (signal) to be traced, a sampling cycle, and a trace period.

Any condition can be set as the trigger condition, and may be, for example, a condition relating to the physical quantity detected by the sensor 50 or the encoder 60, or a condition relating to an internal state of the motor control apparatus 30. For example, the trigger condition is such a condition that the feedback speed falls within a predetermined range, the value of the torque signal falls within a predetermined range, a torque signal rises, the torque signal converges, a torque waveform deviates from a reference range, a temperature is within a predetermined range, or the CPU usage rate falls within a predetermined range.

The axis to be traced is identification information on the motor 40 whose physical quantity is to be measured. The types of the information to be traced are types of information to be stored in the trace data, and are types of information such as the torque signal, the temperature information, the feedback speed, the position deviation, the speed deviation, the current deviation, the CPU usage rate, the memory usage rate, and a communication load. The sampling cycle is a measurement interval of the numerical value. The numerical value is stored in each sampling cycle in the trace data. The trace period is a period from a start of the acquisition to a completion of the acquisition of the trace data.

The setting module 202 reads the acquisition conditions stored in the data storage 200, and transmits the acquisition conditions to the motor control apparatus 30, to thereby set the acquisition conditions. In this embodiment, a description is given of a case in which the setting module 202 uses asynchronous communication to set the acquisition conditions as an asynchronous task, but the setting module 202 may use synchronous communication to set the acquisition conditions as a synchronous task. The setting module 202 sets the acquisition conditions before the acquisition start request for the trace data is transmitted by the acquisition start request module 203 described later.

[Acquisition Start Request Module]

The acquisition start request module 203 is configured to request the motor control apparatus 30 to start the acquisition of the trace data. The acquisition start request is a request for causing the motor control apparatus 30 to start the acquisition of the trace data. The acquisition start request is only required to be made through transmission of data having a predetermined format, and contains an identifier for identifying the acquisition start request. In this embodiment, a description is given of a case in which the acquisition start request module 203 uses the asynchronous communication so as to request the motor control apparatus 30 to start the acquisition of the trace data, but when the communication system 1 does not use the synchronous communication, the acquisition start request module 203 requests to start the acquisition of the trace data without particularly using the asynchronous communication.

In this embodiment, a description is given of a case in which the setting of the acquisition conditions for the trace data and the acquisition start request for the trace data are executed independently, but those processes may be executed as a series of processes. For example, when the controller 20 sets the acquisition conditions for the trace data to the motor control apparatus 30, the motor control apparatus 30 may determine whether or not the trigger condition is satisfied without waiting for the acquisition start request. In this case, when the trigger condition is satisfied while the acquisition start request for the trace data is not particularly made, the motor control apparatus 30 starts the acquisition of the trace data.

[Readout Request Module]

The readout request module 204 is configured to request the motor control apparatus 30 to read out the trace data. The readout request is a request for reading out the trace data, and is also a request for transmitting the trace data. The readout request is only required be executed through transmission of data having a predetermined format, and contains an identifier for identifying the readout request. When the trace data is stored in a specific register of the motor control apparatus 30, the readout request may contain a register address. In this embodiment, a description is given of a case in which the readout request module 204 uses the asynchronous communication so as to request the motor control apparatus 30 to readout the trace data, but when the communication system 1 does not use the synchronous communication, the readout request module 204 requests to read out the trace data without particularly using the asynchronous communication.

In this embodiment, a description is given of a case in which the motor control apparatus 30 does not voluntarily transmit the trace data, and transmits the trace data in response to the readout request from the controller 20, but the motor control apparatus 30 may voluntarily transmit the trace data when the acquisition of the trace data has been completed. In this case, the controller 20 acquires the trace data from the motor control apparatus 30 without particularly requesting for the readout.

[Recording Module]

The recording module 205 is configured to record the trace data received from the motor control apparatus 30 in the data storage 200. In this embodiment, the controller counter is provided, and hence the recording module 205 converts the global timer of the motor control apparatus 30 received from the motor control apparatus 30 to the controller counter, and records the controller counter in the data storage 200 in association with the trace data received from the motor control apparatus 30.

For example, when the controller 20 receives the global timer and the trace data, the recording module 205 refers to the correspondence therebetween in the timer data D, to thereby convert the received global timer to the controller counter. Then, the recording module 205 stores the converted controller counter, the received global timer, and the received trace data in association with one another in the logging file F. In the data storage example shown in FIG. 5, the controller 20 receives trace data storing numerical values of "101", "95", "80", . . . in time series together with a value of the global timer of "100.00" indicating an acquisition start time point. The recording module 205 refers to the correspondence in the timer data D, to thereby convert the value of the global timer of "100.00" to a value of the controller counter of "50000," and stores the global timer and the controller counter in the logging file F together with the numerical value of "101" at the acquisition start time point.

In this embodiment, the sampling cycle of the trace data is determined, and hence the recording module 205 increments the controller counter and the global timer by values corresponding to the sampling cycles for a numerical value after the acquisition start time point, and stores the controller counter and the global timer in the logging file F. For example, when the sampling cycle is expressed as "10" in the controller counter, and is expressed as "0.02" in the global timer, a numerical value of "95" acquired at a next time point after the acquisition start time point is associated with a value of the controller counter of "50010" and a value of the global timer of "100.02" as shown in the data storage example of FIG. 5. Similarly, subsequent numerical values are associated with the controller counter and the global timer incremented by values corresponding to the sampling cycles.

[3-2. Functions to be Implemented in Motor Control Apparatus]

As illustrated in FIG. 3, in the motor control apparatus 30, the data storage 300, the update module 301, a determination module 302, an acquisition module 303, a transmission module 304, and a restriction module 305 are implemented. The data storage 300 is implemented mainly by the storage 32. The update module 301, the determination module 302, the acquisition module 303, the transmission module 304, and the restriction module 305 are implemented mainly by the CPU 31.

[Data Storage]

The data storage 300 is configured to store data required for synchronizing the global timer and acquiring the trace data.

For example, the data storage 300 stores current values of the global timers. The motor control apparatus 30 counts up the global timer, to thereby update a current value of the global timer.

The data stored in the data storage 300 is not limited to the above-mentioned example. For example, the data storage 300 may store the acquisition conditions for the trace data received from the controller 20. Moreover, for example, after the trigger condition is satisfied, the data storage 300 stores the numerical value being measured in time series in association with the value of the global timer at the acquisition start time point of the trace data. Moreover, for example, the data storage 300 may store the IP address of the controller 20.

[Update Module]

The update module 301 is configured to update the global timer of the motor control apparatus 30 based on the global timer of the controller 20 contained in the synchronization request. In this embodiment, a description is given of the case in which the update module 301 overwrites the global timer stored in the data storage 300 with the global timer of the controller 20, but those global timers are not always required to be matched with each other, and some errors may be permitted as described above.

[Determination Module]

The determination module 302 is configured to determine whether or not the predetermined trigger condition is satisfied. The determination module 302 determines whether or not the trigger condition is satisfied based on the physical quantity detected by the sensor 50 or the encoder 60 or on the internal state of the motor control apparatus 30. For example, the determination module 302 determines whether or not the feedback speed detected by the encoder 60 falls within a predetermined range. Moreover, for example, the determination module 302 determines whether or not the value of the torque signal detected by the sensor 50 falls within a predetermined range, the torque signal has risen, the torque signal has converged, or the torque waveform has deviated from the reference range. Moreover, for example, the determination module 302 determines whether or not the temperature detected by the sensor 50 falls within a predetermined range.

Moreover, for example, the determination module 302 determines whether or not the CPU usage rate, the memory usage rate, or the communication load of the motor control apparatus 30 falls within a predetermined range. The trigger condition is only required be determined to be satisfied when each of those determination results is positive or negative.

[Acquisition Module]

The acquisition module 303 is configured to acquire the state data of the motor control apparatus 30. In this embodiment, the trace data corresponds to the state data, and hence the acquisition module 303 acquires the trace data indicating the state change in time series in the motor control apparatus 30 as the state data. For example, the acquisition module 303 acquires the trace data based on the physical quantity detected by the sensor 50 or the encoder 60 or on the internal state of the motor control apparatus 30.

In this embodiment, when the acquisition module 303 receives the acquisition start request from the controller 20 though use of asynchronous communication, the acquisition module 303 acquires the trace data. That is, the acquisition module 303 starts the acquisition of the trace data in response to the reception of the acquisition start request. In other words, the acquisition module 303 does not start the acquisition of the trace data until the acquisition start request is received, and starts the acquisition of the trace data when the acquisition start request is received.

In this embodiment, when the acquisition start request is received, but the trigger condition is not satisfied, the acquisition of the trace data is not started, and hence the acquisition module 303 acquires the trace data when the trigger condition is satisfied. That is, the acquisition module 303 starts the acquisition of the trace data in response to the determination that the trigger condition is satisfied. The acquisition module 303 does not start the acquisition of the trace data when the trigger condition is not determined to be satisfied, and starts the acquisition of the trace data when the trigger condition is determined to be satisfied.

In this embodiment, the acquisition module 303 acquires the trace data based on the acquisition conditions. For example, when an axis to be traced is indicated in the acquisition condition, the acquisition module 303 acquires the trace data based on a state of the axis to be traced. Moreover, for example, when a type of information (signal) to be traced is indicated in the acquisition condition, the acquisition module 303 acquires the trace data based on the type of information. Moreover, for example, when the sampling cycle is indicated in the acquisition condition, the acquisition module 303 acquires the trace data based on the sampling cycle. Moreover, for example, when the trace period is indicated in the acquisition condition, the acquisition module 303 acquires the trace data based on this trace period.

[Transmission Module]

The transmission module 304 is configured to transmit to the controller 20 the global timer at the time when the state data is acquired and the trace data. In this embodiment, the trace data corresponds to the state data, and hence the transmission module 304 transmits to the controller 20 the global timer of the motor control apparatus 30 at the time when the trace data is acquired and the trace data. The global timer and the trace data may be integrally transmitted as data, or may be individually transmitted as data.

The global timer at the time when the trace data is acquired is a value of the global timer at any time point from the start to the end of the acquisition of the trace data. In this embodiment, a description is given of the case in which the transmission module 304 transmits the global timer at the time point at which the acquisition of the trace data is started, but may transmit the global timer at a time point at which the acquisition of the trace data is completed. Moreover, for example, the transmission module 304 may transmit the global timer at a time point after the time point at which the acquisition of the trace data is started and before the time point at which the acquisition of the trace data is completed. In addition, for example, the transmission module 304 may transmit not only the global timer at a certain time point, but also the global timer at all of the time points at which the numerical values contained in the trace data are measured.

In this embodiment, the motor control apparatus 30 does not voluntarily transmit the trace data, and hence the transmission module 304 transmits the global timer and the trace data of the motor control apparatus 30 when the readout request is received from the controller 20. That is, the transmission module 304 transmits the global timer and the trace data of the motor control apparatus 30 in response to the reception of the readout request from the controller 20. When the readout request is not received from the controller 20, the transmission module 304 holds the transmission of the global timer and the trace data. When the readout request is received from the controller 20, the transmission module 304 transmits the global timer and the trace data.

[Restriction Module]

The restriction module 305 is configured to restrict the acquisition of the trace data when the trigger condition is not satisfied by a predetermined time limit. The predetermined time limit is only required to be a time limit set in advance, and may be, for example, a period equal to or shorter than the maximum period that can be expressed by the global timer. The restriction on the acquisition of the trace data is to prevent the motor control apparatus 30 from acquiring the trace data or to prevent the motor control apparatus 30 from transmitting the trace data.

For example, the restriction module 305 starts clocking processing after the acquisition conditions are set or the acquisition start request is received, and determines whether or not the predetermined time limit arrives. When the trigger condition is satisfied before the predetermined time limit arrives, the restriction module 305 does not restrict the acquisition of the trace data. When the trigger condition is not satisfied even when the predetermined time limit arrives, the restriction module 305 restricts the acquisition of the trace data.

[3-3. Functions to be Implemented in Data Collection Apparatus]

As illustrated in FIG. 3, in the data collection apparatus 10, a data storage 100 and a display control module 101 are implemented. The data storage 100 is implemented mainly by the storage 12. The display control module 101 is implemented mainly by the CPU 11.

[Data Storage]

The data storage 100 is configured to store the logging file F received from the controller 20 by the data collection apparatus 10. In addition, for example, the data storage 100 may store the machine information indicating the configurations of the motor control apparatus 30 and sensors connected to the controller 20, and the IP address of the controllers 20. Moreover, for example, the data storage 100 may store the acquisition conditions for the trace data. In this case, the acquisition conditions may be loaded from the data collection apparatus 10 onto the controller 20.

Moreover, for example, the data storage 100 may store commands directed from the controller 20 to the motor control apparatus 30 in time series. For example, the data storage 100 may store the relationship between the controller counter or the global timer indicating the time point at which the operation command (for example, the position command speed) for the motor 40 is transmitted and the details of this operation command in time series. The relationship therebetween may be defined in a program or a parameter, and the data storage 100 may store the program or the parameter.

[Display Control Module]

The display control module 101 is configured to display the command and the trace data for comparison, based on the global timer of the controller 20 at the time when the command is transmitted and the global timer of the motor control apparatus 30 received from the motor control apparatus 30. For example, the display control module 101 displays a change in time series in the command transmitted by the controller 20 to the motor control apparatus 30 and a change in time series in the numerical value indicated by the trace data (a change in time series in an actually measured value corresponding to the command) so as to be able to be compared with each other.

Figure 6:
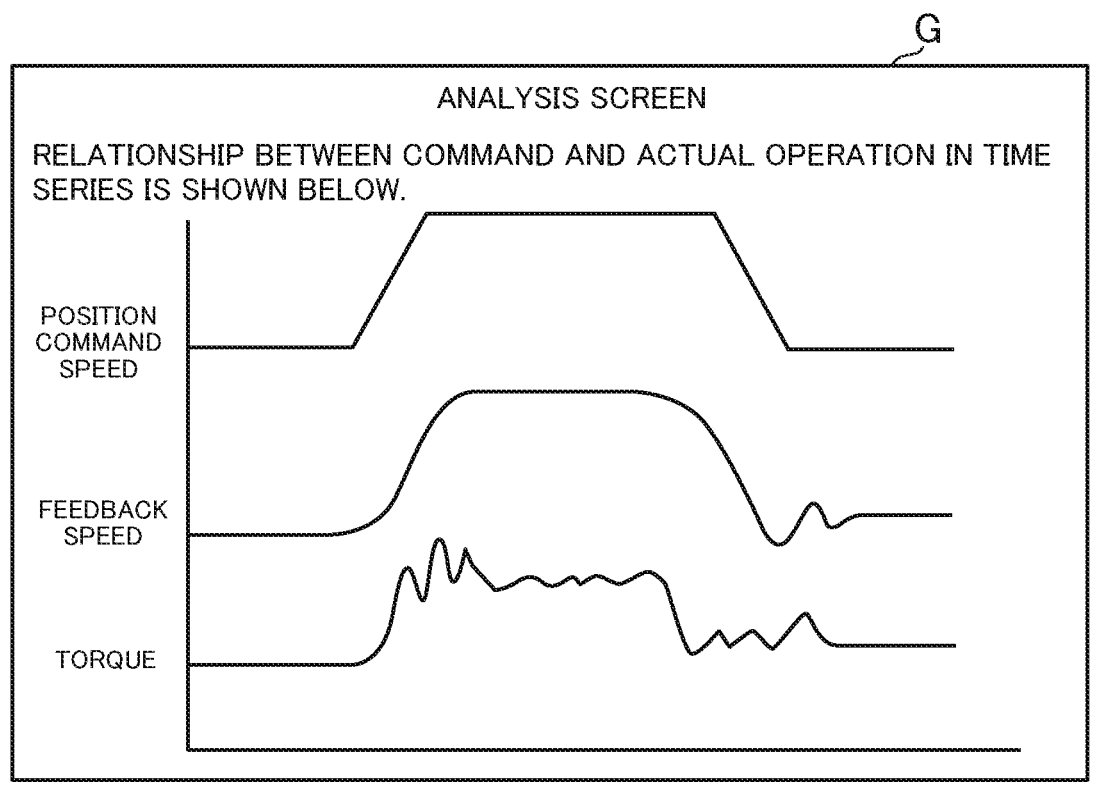
FIG. 6 is a diagram for illustrating an example of an analysis screen displayed on a data collection apparatus.

FIG. 6 is a diagram for illustrating an example of a screen displayed on the data collection apparatus 10. In the example illustrated in FIG. 6, the change in time series in the position command speed of the motor 40 and changes in time series in the feedback speed and the torque indicated by the trace data are displayed on a screen G. The display control module 101 refers to the data storage 100, to thereby acquire the change in time series in the command, and refers to the logging file F, to thereby acquire the change in time series in the numerical values indicating the actual operation. The common global timer is associated with those pieces of information, and hence the display control module 101 displays the actual measurement values corresponding to the command on the same time axis so as to be able to be compared with each other. For example, the display control module 101 may display the command and the actual measurement values so as to be arranged on the upper row and the lower row as illustrated in FIG. 6, or may display the command and the actual measurement values so as to be superimposed on each other on the same graph.

4. PROCESSING TO BE EXECUTED TO BE EXECUTED BY COMMUNICATION SYSTEM

Figure 7:
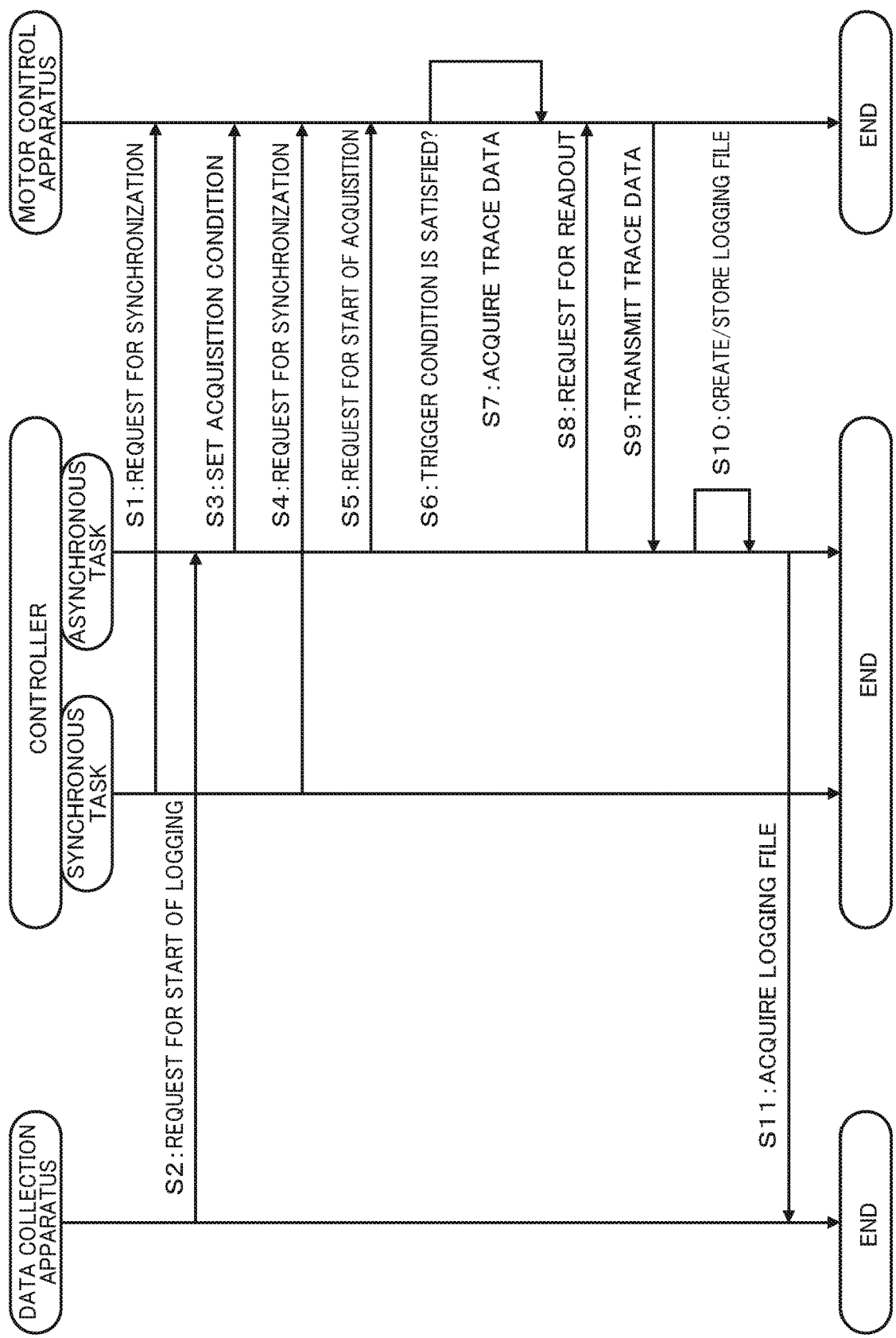
FIG. 7 is a flowchart for illustrating processing to be executed in the communication system.

FIG. 7 is a flowchart for illustrating processing to be executed in the communication system 1. The processing illustrated in FIG. 7 is executed by the CPUs 11, 21, and 31 operating in accordance with programs stored in the storages 12, 22, and 32, respectively. The processing described below is an example of processing to be executed by the functional blocks illustrated in FIG. 3. It is assumed that the controller 20 counts up the global timer and the controller counter in the storage 22, and the motor control apparatus 30 counts up the global timer in the storage 32. Moreover, in FIG. 7, an operation command for the motor 40 from the controller 20 to the motor control apparatus 30 is omitted.

As illustrated in FIG. 7, first, the controller 20 transmits the synchronization request for the global timer to the motor control apparatus 30 as the synchronous task (Step S1). In Step S1, the controller 20 executes clocking processing, to thereby determine whether a start time point of the transmission cycle has arrived. When the controller 20 determines that the start time point of the transmission cycle has arrived, the controller 20 transmits the synchronization request containing the global timer of the storage 22 as the synchronous task. The motor control apparatus 30 processes the synchronization request as the synchronous task, to thereby overwrite the global timer of the storage 32.

The data collection apparatus 10 transmits a logging start request to the controller 20 (Step S2). The logging start request is a request for starting the acquisition of the trace data to be stored in the logging file F, and is a request for causing the controller 20 to set the acquisition conditions in this case. The logging start request is only required be executed through transmission of data having a predetermined format, and contains an identifier for identifying the logging start request. The logging start request is transmitted at any timing, and may be transmitted, for example, when an alarm is generated in the controller 20, or may be transmitted at a timing specified by a user.

When the controller 20 receives the logging start request, the controller 20 sets the acquisition conditions to the motor control apparatus 30 as an asynchronous task (Step S3). The acquisition conditions may be loaded from the data collection apparatus 10 onto the controller 20 in advance, or may be contained in the logging start request. In Step S3, the controller 20 transmits the acquisition conditions stored in the storage 22 to the control apparatus 30. When the motor control apparatus receives the acquisition conditions, the motor control apparatus 30 stores the acquisition conditions in the storage 32.

Subsequently, when a next transmission cycle arrives, the controller 20 transmits the synchronization request for the global timer to the motor control apparatus 30 as a synchronous task (Step S4). The processing in Step S4 is the same as that in Step S1. Subsequently, each time the transmission cycle arrives, the synchronization request is transmitted.

The controller 20 transmits the acquisition start request as an asynchronous task to the motor control apparatus 30 (Step S5). In Step S5, for example, the controller 20 may transmit the acquisition start request when such a response that the setting of the acquisition conditions, which is the asynchronous task transmitted in Step S3, has been completed is received from the motor control apparatus 30, or may transmit the acquisition start request immediately after the transmission of the asynchronous task relating to the setting of the acquisition conditions in Step S3.

When the motor control apparatus 30 receives the acquisition start request, the motor control apparatus 30 processes the acquisition start request as an asynchronous task, to thereby determine whether or not the trigger condition is satisfied (Step S6). In Step S6, the motor control apparatus 30 determines whether or not the trigger condition, which is one of the acquisition conditions set in Step S3, is satisfied. When the trigger condition is not satisfied within a predetermined limit period, subsequent processing of Step S7 to Step S11 is not executed.

When it is determined that the trigger condition is satisfied (Y in Step S6), the motor control apparatus 30 starts the acquisition of the trace data, to thereby acquire the trace data (Step S7). In Step S7, the motor control apparatus 30 holds a current value of the global timer in the storage 32, and starts the acquisition of the trace data based on the acquisition conditions set in Step S3, and a signal of the sensor 50, the encoder 60, or the like. Subsequently, the motor control apparatus 30 repeats the acquisition of the numerical value to be measured in each sampling cycle until the trace period is finished.

The controller 20 transmits to the motor control apparatus 30 the readout request for the trace data as an asynchronous task (Step S8). In Step S8, the controller 20 may transmit the readout request when the controller 20 receives from the motor control apparatus 30 such a response that the asynchronous task for the acquisition start request transmitted in Step S5 has been completed, or may transmit the readout request when a certain period has elapsed after the asynchronous task for the acquisition start request was transmitted in Step S5.

When the motor control apparatus 30 receives the readout request, the motor control apparatus 30 processes the readout request as an asynchronous task, and transmits the trace data together with the global timer at the acquisition start time point to the controller 20 (Step S9). In Step S9, the motor control apparatus 30 transmits the global timer held in Step S7 and the trace data acquired in Step S7.

When the controller 20 receives the trace data, the controller 20 creates the logging file F, and stores the logging file F in the storage 22 (Step S10). In Step S10, the controller 20 converts the global timer indicating the acquisition start time point of the trace data to the controller counter based on the timer data D, and associates this controller counter with a first numerical value of the trace data. Moreover, the controller 20 associates the controller counter and the global timer with second and later numerical values while incrementing the controller counter and the global timer by the values corresponding to the sampling cycle. The controller 20 stores the controller counter, the global timer, and the numerical values of the trace data in the logging file F.

The controller 20 transmits the logging file F to the data collection apparatus 10 (Step S11), and this processing is finished. For example, the data collection apparatus 10 uses the FTP or the like so as to receive the logging file F, and stores the logging file F in the storage 12. Subsequently, the data collection apparatus 10 displays the screen G on the display 15 based on the logging file F when the user executes a predetermined operation through the operation interface 14.

With the above-mentioned communication system 1, the global timer updated by the controller 20 and the global timer updated by the motor control apparatus 30 are synchronized with each other, and hence the controller 20 can accurately grasp the time point at which the trace data was acquired. For example, even in a case in which time has elapsed when the trace data is actually acquired after the controller 20 transmitted the acquisition request for the trace data, or even in a case in which a time has elapsed when the controller 20 reads out the trace data after the trace data was acquired, the global timer of the controller 20 and the global timer of the motor control apparatus 30 are synchronized with each other, and hence the controller 20 can accurately grasp at which time point the trace data was acquired.

Moreover, the trace data is not transmitted to the controller 20 immediately after the trace data is acquired by the motor control apparatus 30, but is transmitted only after the controller 20 makes the readout request, and time may have elapsed when the readout request is received after the trace data was acquired. In this case, it is difficult for the controller 20 to identify the time point of the trace data when only the trace data is transmitted to the controller 20. However, with the communication system 1, the global timer of the controller 20 and the global timer of the motor control apparatus 30 are synchronized with each other, and hence, even in a case in which time has elapsed when the readout request is received after the trace data was acquired, the controller 20 can accurately grasp the time point of the trace data.

Moreover, in a case in which the asynchronous communication is used, even when the controller 20 transmits the acquisition start request for the trace data, it is not certain when the request is executed, and hence time may have elapsed when the trace data is actually acquired after the acquisition start request was transmitted. In this case, it is difficult for the controller 20 to identify the time point of the trace data when only the trace data is transmitted to the controller 20. However, with the communication system 1, the global timer of the controller 20 and the global timer of the motor control apparatus 30 are synchronized with each other, and hence, even in a case in which time has elapsed when the trace data is actually acquired after the acquisition request was transmitted, the controller 20 can accurately grasp the time point of the trace data.

Moreover, when the trace data is acquired under the state in which the trigger condition is satisfied inside the motor control apparatus 30, the controller 20 cannot grasp when the trigger condition was satisfied, and hence it is difficult to identify at which time point the trace data was acquired when only the trace data is transmitted. With the communication system 1, the global timer of the controller 20 and the global timer of the motor control apparatus 30 are synchronized with each other. Thus, even in a case in which the trace data is acquired when the trigger condition is satisfied, the controller 20 can grasp the time point of the trace data.

Moreover, when the communication between the controller 20 and the motor control apparatus 30 is disconnected, pieces of time information cannot be synchronized with each other, and hence a deviation in time between the controller 20 and the motor control apparatus 30 gradually increases. In this case, when the trigger condition is not satisfied for a long period of time, the trace data maybe transmitted together with the global timer of the motor control apparatus 30, which is greatly deviated in time. However, with the communication system 1, the acquisition of the trace data is restricted in this case, and hence, for example, the trace data can be prevented from being transmitted together with the global timer of the motor control apparatus 30, which is greatly deviated in time.

Moreover, the motor control apparatus 30 can be set to the time on the controller 20 side by updating the global timer of the motor control apparatus 30 based on the global timer of the controller 20, and hence the controller 20 can more accurately grasp the time of the acquisition of the trace data.

Moreover, trace data having desired content can be acquired through the setting of the acquisition conditions for the trace data by the controller 20. Moreover, the controller 20 includes the controller counter as the time information different from the global timer of the controller 20 for the synchronization, and hence the controller 20 can use the unique time information that is not influenced by other machines so as to manage the trace data by converting the global timer of the motor control apparatus 30 to the controller counter so as to be associated with the trace data, resulting in easy management of the trace data.

Moreover, the global timer of the controller 20 updated by the controller 20 serving as the master machine and the global timer of the motor control apparatus 30 updated by the motor control apparatus 30 serving as the slave machine are synchronized with each other, and hence the controller 20 serving as the master machine can accurately grasp the time at which the trace data was acquired in the motor control apparatus 30 serving as the slave machine.

Moreover, the global timer of the controller 20 and the global timer of the motor control apparatus 30 are synchronized with each other, and the command from the controller 20 serving as the master machine and the trace data are also associated with each other in terms of time. Thus, and it is possible to display in which state the actual measurement value is with respect to the command in an easy-to-understand manner by displaying the command and the trace data so as to be compared with each other. Therefore, it is possible to effectively support the analysis of the operations of the industrial machines.

Moreover, the global timer updated by the controller 20 and the global timer updated by the motor control apparatus 30 are synchronized with each other, and hence the controller 20 can accurately grasp the time point at which the trace data, which is an example of the state data, was acquired.

5. MODIFICATION EXAMPLE

The present invention is not limited to the embodiment described above, and can be modified suitably without departing from the spirit of the present invention.

For example, a description is given of the case in which the global timer of the controller 20 and the global timer of the one motor control apparatus 30 are synchronized with each other in the embodiment, but the controller 20 may synchronize the global timer with the global timers of a plurality of motor control apparatus 30. In this case, when each of the plurality of motor control apparatus 30 receives the synchronization request for the global timer from the controller 20, each of the plurality of motor control apparatus 30 may overwrite the own global timer with the global timer of the controller 20 contained in the synchronization request.

Moreover, for example, the first industrial machine is not limited to the controller 20, and the second industrial machine is not limited to the motor control apparatus 30. For example, the global timers of the controllers 20 may be synchronized with each other. A certain controller 20 may correspond to the first industrial machine, and another controller 20 may correspond to the second industrial machine.

Figure 8:
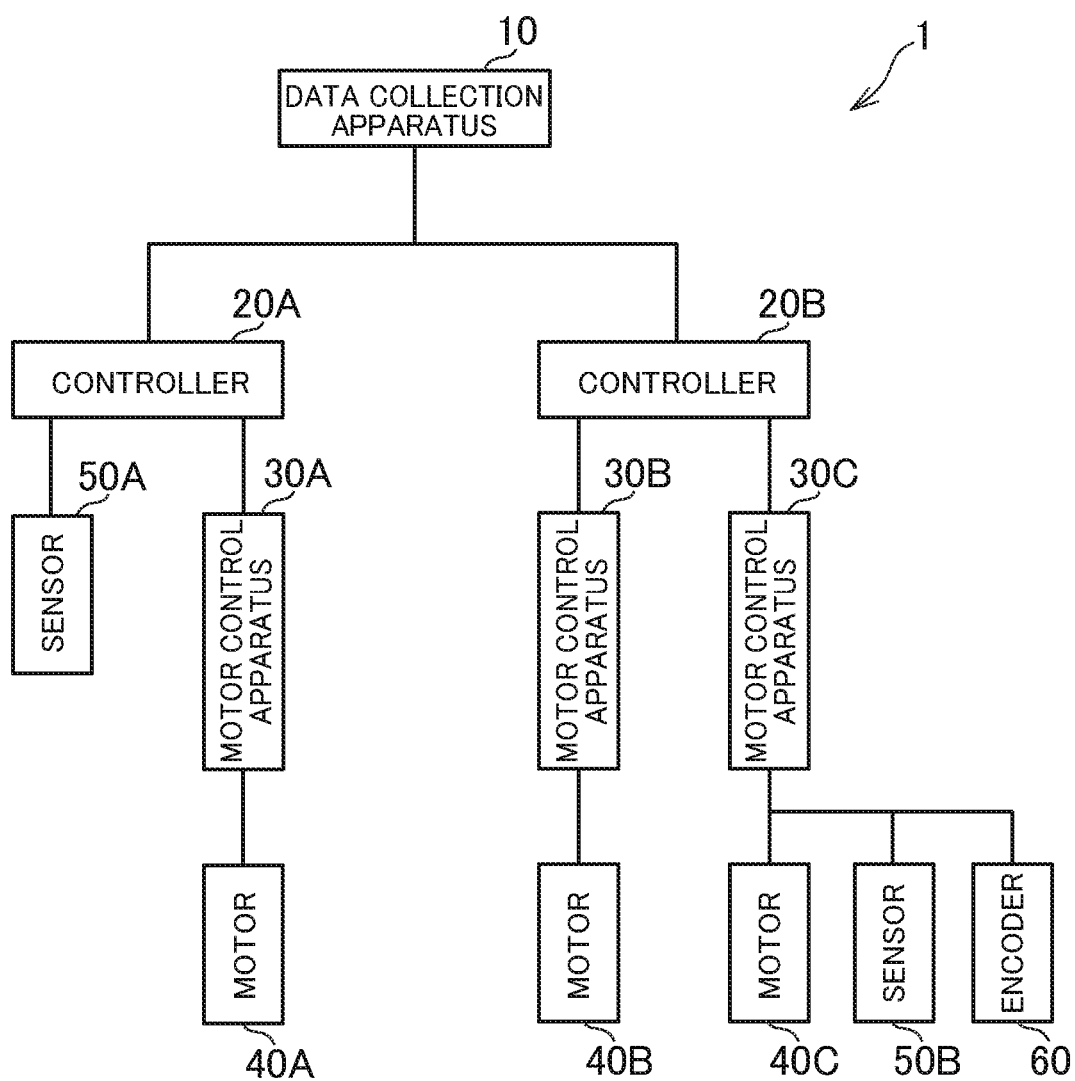
FIG. 8 is a diagram for illustrating an overall configuration of a communication system according to a modification example of the present invention.

FIG. 8 is a diagram for illustrating the overall configuration of the communication system 1 according to the modification example of the present invention. As illustrated in FIG. 8, a plurality of controllers 20A and 20B are connected to the data collection apparatus 10, and the logging file F may be able to be collected from each of the plurality of the controllers 20A and 20B. Further, the global timers may be synchronized between the controller 20A and the controller 20B. In this case, the controller 20A may correspond to the first industrial machine, and the controller 20B may correspond to the second industrial machine. Conversely, the controller 20B may correspond to the first industrial machine, and the controller 20A may correspond to the second industrial machine.

For example, the controller 20A transmits the synchronization request for the global timer to the controller 20B. The controller 20B overwrites the own global timer with the global timer of the controller 20A based on the synchronization request. As processing in which each of the controllers 20A and 20B receives the trace data from each of the motor control apparatus 30A to 30C connected to each of the controllers 20A and 20B themselves, the same processing as the processing described in the embodiment may be executed.

For example, the controller 20B synchronizes itself with the motor control apparatus 30B and 30C connected to itself based on the global timer synchronized with the controller 20A, to thereby acquire the global timers at the acquisition start time points of the trace data and the trace data from the motor control apparatus 30B and 30C. The controller 20B may transmit the acquired global timers and the trace data to the controller 20A or the data collection apparatus 10. In this case, the controller 20B may prepare an own controller counter, and may convert the global timers to the own controller counters.

The controller 20A may independently include a global timer for synchronization with the motor control apparatus 30, and a global timer for synchronization with the controller 20B. Similarly, the controller 20B may independently include a global timer for synchronization with the motor control apparatus 30, and a global timer for synchronization with the controller 20A. When the controller 20B transmits the trace data to the controller 20A, the global timer for the synchronization with the motor control apparatus 30 may be converted to the global timer for the synchronization with the controller 20A, and the obtained global timer may be transmitted.

Moreover, for example, a description is given of the case in which the trace data is acquired as the state data, but the state data may be data stored in a specific register at one time point. In this case, the controller 20 transmits a request for reading out the specific register of the motor control apparatus 30. Moreover, for example, the trigger condition for the trace data may not particularly be set. Moreover, for example, the global timers may be synchronized with each other by a third-party machine different from the controller 20 and the motor control apparatus 30. Moreover, for example, the controller counter may be omitted. Moreover, for example, the trace data may not be displayed, but may be used so as to be input to an application for the analysis. Moreover, for example, the controller 20 may synchronize itself with the global timer of the motor control apparatus 30, and the synchronization module 201 maybe implemented by the motor control apparatus 30. Moreover, for example, the data collection apparatus 10 may be a cloud server or the like.

Further, the embodiment described above is given as a specific example, and is not to limit the invention disclosed herein to the very configuration and data storage examples of the specific example. A person skilled in the art may make various modifications to the disclosed embodiment with regard to, for example, the shapes and numbers of physical components, data structures, and execution orders of processing. It is to be understood that the technical scope of the invention disclosed herein encompasses such modifications.

What is claimed is:

1. A communication system, in which a first industrial machine and a second industrial machine are configured to communicate to/from each other, the communication system comprising:
   circuitry configured to use synchronous communication to synchronize first time information updated by the first industrial machine and second time information updated by the second industrial machine with each other,
   wherein the first industrial machine is configured to use asynchronous communication to send a start request to the second industrial machine,
   wherein the second industrial machine is configured to:
   determine whether a predetermined trigger condition is satisfied;
   acquire state data on the second industrial machine when the start request is received from the first industrial machine through use of the asynchronous communication and the predetermined trigger condition is satisfied; and
   transmit to the first industrial machine the state data and the second time information indicating when the state data was acquired by the second industrial machine.

2. The communication system according to claim 1, wherein the start request causes the second industrial machine to start recording the state data
   wherein the first industrial machine is configured to send a readout request that is different from the start request to the second industrial machine, and
   wherein the second industrial machine is configured to:
   start the recording the state data when the start request is received, and
   transmit the state data and the second time information indicating when the state data was acquired, upon receiving the readout request from the first industrial machine.

3. The communication system according to claim 1, wherein the second industrial device is configured to:
   control a motor,
   is connected to a sensor or an encoder that detects a physical quantity of the motor, and
   determine the predetermined trigger condition by determining whether the trigger condition is satisfied based on the physical quantity detected by the sensor or the encoder.

4. The communication system according to claim 3, wherein the second industrial device is configured to:
   determine the predetermined trigger condition by determining whether the feedback speed detected by the encoder falls within a predetermined range, or
   determine the predetermined trigger condition by determining whether a torque signal detected by the sensor falls within a predetermined range, the torque signal has risen, the torque signal has converged, or the torque waveform has deviated from the reference range, or determine the predetermined trigger condition by determining whether or not a temperature detected by the sensor falls within a predetermined range.

5. The communication system according to claim 4, wherein the second industrial machine is configured to restrict an acquisition of the state data when the predetermined trigger condition is not satisfied by a predetermined time limit.

6. The communication system according to claim 1,
wherein the circuitry is implemented by the first industrial machine,
wherein the circuitry is configured to transmit a synchronization request containing the first time information to the second industrial machine, and
wherein the second industrial machine is configured to update the second time information based on the first time information contained in the synchronization request.

7. The communication system according to claim 1,
wherein the first industrial machine is configured to set an acquisition condition for the state data to the second industrial machine, and
wherein the second industrial machine is configured to acquire the state data based on the acquisition condition.

8. The communication system according to claim 1,
wherein the first industrial machine is configured to update time information with different time information from the first time information,
wherein the first industrial machine is configured to convert the second time information received from the second industrial machine to the different time information, and record the different time information in a storage in association with the state data received from the second industrial machine, and
wherein the different time information is in a different format than the first time information.

9. The communication system according to claim 1,
wherein the first industrial machine is a master machine,
wherein the second industrial machine is a slave machine configured to operate based on a command from the master machine,
wherein the slave machine is configured to acquire the state data on the slave machine, and
transmit to the master machine the second time information at a time when the state data is acquired and the state data.

10. The communication system according to claim 9, wherein the circuitry is configured to display the command and the state data for comparison, based on the first time information at a time when the command is transmitted and the second time information received from the second industrial machine.

11. The communication system according to claim 1,
wherein the second industrial machine is configured to acquire, as the state data, trace data indicating a state change in time series in the second industrial machine, and
transmit to the first industrial machine the second time information at a time when the trace data is acquired and the trace data.

12. A communication method for performing communication between a first industrial machine and a second industrial machine, the communication method comprising:

using synchronous communication to synchronize first time information updated by the first industrial machine and second time information updated by the second industrial machine with each other;
using asynchronous communication to send a start request to the second industrial machine;
determining whether a predetermined trigger condition is satisfied;
causing the second industrial machine to acquire state data when the start request is received from the first industrial machine through use of the asynchronous communication and the predetermined trigger condition is satisfied; and
transmitting the state data and the second time information indicating when the state data was acquired to the first industrial machine.

13. A non-transitory computer readable information storage medium storing a program for causing, when first time information updated by a first industrial machine and second time information updated by a second industrial machine are synchronized with each other by using synchronous communication, the second industrial machine to:
determine whether a predetermined trigger condition is satisfied;
acquire state data on the second industrial machine when a start request is received from the first industrial machine through use of asynchronous communication and the predetermined trigger condition is satisfied; and
transmit the state data and the second time information indicating when the state data was acquired to the first industrial machine.

14. The communication system according to claim 2,
wherein the circuitry is configured to use synchronous communication to synchronize the first time information and the second time information with each other,
wherein the first industrial machine is configured to use asynchronous communication to send a start request the second industrial machine, and
wherein the second industrial machine is configured to acquire the state data when the start request is received from the first industrial machine through use of the asynchronous communication.

15. The communication system according to claim 2,
wherein the second industrial machine is configured to determine whether a predetermined trigger condition is satisfied, and
acquire the state data when the predetermined trigger condition is satisfied.

16. The communication system according to claim 3,
wherein the second industrial machine is configured to determine whether a predetermined trigger condition is satisfied, and
acquire the state data when the predetermined trigger condition is satisfied.

17. The communication system according to claim 2,
wherein the circuitry is implemented by the first industrial machine,
wherein the circuitry is configured to transmit a synchronization request containing the first time information to the second industrial machine, and
wherein the second industrial machine is configured to update the second time information based on the first time information contained in the synchronization request.

18. The communication system according to claim 3,
wherein the circuitry is implemented by the first industrial machine, wherein the circuitry is configured to transmit a synchronization request containing the first time information to the second industrial machine, and wherein the second industrial machine is configured to update the second time information based on the first time information contained in the synchronization request.

19. The communication system according to claim 4, wherein the circuitry is implemented by the first industrial machine, wherein the circuitry is configured to transmit a synchronization request containing the first time information to the second industrial machine, and wherein the second industrial machine is configured to update the second time information based on the first time information contained in the synchronization request.

20. The communication system according to claim 1, wherein the predetermined trigger condition is at least one of:

a condition relating to a physical quantity detected by a sensor or an encoder of the second industrial machine, a condition relating to an internal state of the second industrial machine, a condition that a feedback speed of the second industrial machine falls within a first predetermined range, a condition that a value of a torque signal of the second industrial machine falls within a second predetermined range, a condition that a torque signal of the second industrial machine rises, a condition that a torque signal of the second industrial machine converges, a condition that a torque waveform of the second industrial machine deviates from a reference range, a condition that a temperature of the second industrial machine is within a third predetermined range, and a condition that CPU usage rate of the second industrial machine falls within a fourth predetermined range.

* * * * *